US009482102B2

(12) United States Patent
Klein et al.

(10) Patent No.: US 9,482,102 B2
(45) Date of Patent: Nov. 1, 2016

(54) METHOD OF REINFORCING A MECHANICAL PART

(75) Inventors: Gilles Charles Casimir Klein, Mery sur Oise (FR); Jean-Michel Patrick Maurice Franchet, Paris (FR); Gilbert Michel Marin Leconte, Ozoir la Ferriere (FR); Dominique Magnaudeix, Yerres (FR)

(73) Assignee: SNECMA, Paris (FR)

( * ) Notice: Subject to any disclaimer, the term of this patent is extended or adjusted under 35 U.S.C. 154(b) by 402 days.

(21) Appl. No.: 14/122,917

(22) PCT Filed: May 23, 2012

(86) PCT No.: PCT/FR2012/051162
§ 371 (c)(1),
(2), (4) Date: Nov. 27, 2013

(87) PCT Pub. No.: WO2012/164205
PCT Pub. Date: Dec. 6, 2012

(65) Prior Publication Data
US 2014/0086753 A1    Mar. 27, 2014

(30) Foreign Application Priority Data
May 27, 2011  (FR) ...................................... 11 54676

(51) Int. Cl.
*F04D 29/38*    (2006.01)
*F01D 5/28*    (2006.01)
(Continued)

(52) U.S. Cl.
CPC .............. *F01D 5/282* (2013.01); *B23K 20/02* (2013.01); *F04D 29/023* (2013.01); *F04D 29/324* (2013.01); *F04D 29/542* (2013.01); *B23K 2201/001* (2013.01); *B29C 65/48* (2013.01); *B29C 66/721* (2013.01); *B29C 66/742* (2013.01); *B29L 2031/082* (2013.01); *F05D 2240/303* (2013.01); *F05D 2300/174* (2013.01); *F05D 2300/2261* (2013.01);
(Continued)

(58) Field of Classification Search
CPC .... F01D 5/282; F04D 29/023; F04D 29/324; F04D 29/542
See application file for complete search history.

(56) References Cited

U.S. PATENT DOCUMENTS 3,294,366 A    12/1966  Coplin
3,649,425 A *  3/1972   Alexander ......... B23K 20/2333
                                            156/213

(Continued)

FOREIGN PATENT DOCUMENTS

EP    1 533 067 A1    5/2005
EP    1 826 363 A2    8/2007
(Continued)

OTHER PUBLICATIONS

International Search Report issued Sep. 28, 2012, in PCT/FR12/051162 filed May 23, 2012.

*Primary Examiner* — Woody Lee, Jr.
(74) *Attorney, Agent, or Firm* — Oblon, McClelland, Maier & Neustadt, L.L.P.

(57) ABSTRACT

A method of reinforcing a mechanical part, for example a turbine engine part, the part being made by assembling together two portions, the method including: inserting reinforcing mechanisms of elongate shape at least in part in at least one recess formed in one of the portions and opening out into a junction surface between the portions; and assembling the two portions together.

10 Claims, 2 Drawing Sheets

(51) Int. Cl.
*F04D 29/02* (2006.01)
*F04D 29/32* (2006.01)
*F04D 29/54* (2006.01)
B23K 20/02 (2006.01)
*B29C 65/00* (2006.01)
*B29C 65/48* (2006.01)
*B29L 31/08* (2006.01)

(52) U.S. Cl.
CPC ........... *F05D 2300/6032* (2013.01); *F05D 2300/614* (2013.01); *F05D 2300/702* (2013.01); *Y10T 29/49337* (2015.01)

(56) References Cited

U.S. PATENT DOCUMENTS

| | | | |
|---|---|---|---|
| 3,762,835 A | 10/1973 | Carlson et al. | |
| 4,108,572 A * | 8/1978 | Platt | B23P 15/04 416/224 |
| 4,919,594 A * | 4/1990 | Wright | C22C 47/064 29/527.5 |
| 6,050,047 A | 4/2000 | Covelli et al. | |
| 7,516,548 B2 * | 4/2009 | Twigg | B23K 20/023 228/165 |
| 7,736,130 B2 * | 6/2010 | Schilling | B64C 11/205 416/224 |
| 2005/0166386 A1 | 8/2005 | Twigg | |
| 2007/0201984 A1 | 8/2007 | Liston | |
| 2013/0004322 A1 * | 1/2013 | Schwarz | F01D 5/28 416/224 |

FOREIGN PATENT DOCUMENTS

| | | |
|---|---|---|
| GB | 1040825 | 9/1966 |
| GB | 2 039 526 A | 8/1980 |

* cited by examiner

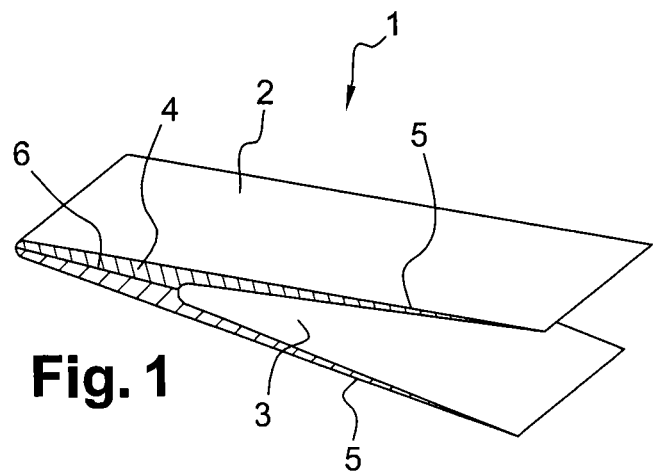
Fig. 1
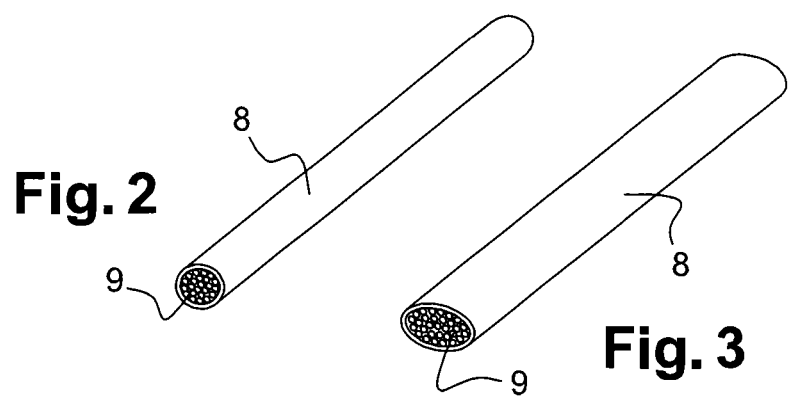
Fig. 2
Fig. 3
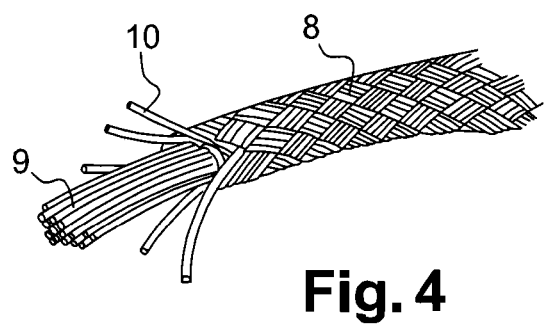
Fig. 4

METHOD OF REINFORCING A MECHANICAL PART

BACKGROUND OF THE INVENTION

1. Field of the Invention

The present invention relates to a method of reinforcing a mechanical part, such as a turbine engine part, for example, the part being made by assembling together two portions, e.g. by diffusion bonding.

2. Description of the Related Art

In order to reduce the weight and the cost of turbine engine fan blades, they are generally made of composite material. Fan blades need to withstand high levels of stress and impact because of their speed of rotation and because of impacts against particles or foreign bodies that might penetrate into the air stream. That is why composite blades are protected at their leading and/or trailing edges by metal reinforcement adhesively bonded on the airfoils of the blades.

Document EP 1 574 270-A1 in the name of the Applicant describes a method of making reinforcement by superplastic forming and diffusion bonding (SPF/DB), the method consisting in:
   bonding two metal sheets together by diffusion bonding in order to obtain a preform, portions of the sheets being covered in an anti-diffusion substance in order to prevent them bonding together in determined zones;
   cambering and twisting the preform;
   inflating the preform so that it is subjected to superplastic forming; and
   cutting the preform to shape to obtain the reinforcement.

That method does not make it possible to obtain accurate control over the inside shape of the cavity in the reinforcement. In particular, the junction zones between the sheets form stress concentration zones and crack starter zones that weaken the reinforcement.

In order to improve the mechanical behavior of the reinforcement, a method of making metal reinforcement is proposed in patent application FR 10/51992, filed by the applicant and not yet published, which method consists in:
   shaping two metal sheets by die stamping so as to make them approximate the final shape of the reinforcement that is to be made;
   positioning the two sheets on either side of a core that reproduces the inside shapes of the suction side and of the pressure side of the reinforcement;
   assembling the two sheets together about the core in leaktight manner under a vacuum;
   shaping the sheets on the core by hot isostatic compression; and
   cutting the sheets to separate the reinforcement and release the core.

The hot isostatic compression of the sheets enables the sheets to be shaped to match the shape of the core and makes it possible, in the junction zone of the sheets, to obtain a large connection radius, and consequently to avoid any zone in which stresses are concentrated or that have crack starters.

The resulting reinforcement has a solid zone for absorbing the energy of impacts against particles or foreign bodies, which solid zone is extended by two lips for pressing respectively against the pressure side and the suction side of the blade to be protected.

There exists a need to improve the mechanical behavior of reinforcement in order to protect composite material blades against ingesting heavy foreign bodies such as birds, but without that significantly increasing the weight of the reinforcement.

BRIEF SUMMARY OF THE INVENTION

A particular object of the invention is to provide a solution to that problem that is simple, effective, and inexpensive.

To this end, the invention provides a method of reinforcing a mechanical part, such as a part of a turbine engine, for example, which part is made by assembling together two portions, the method being characterized in that it comprises the steps consisting in:
   forming at least one recess in each of the junction surfaces of the two portions of the part;
   inserting reinforcing means of elongate shape at least in part in said a recess; and
   assembling together the two portions e.g. by diffusion bonding.

Inserting reinforcing means in the mechanical part serves to increase its mechanical characteristics without significantly increasing its weight.

Advantageously, the reinforcing means comprise at least one bundle of reinforcing fibers surrounded by a sheath for holding and protecting the fibers.

The sheath serves to hold the fibers in position in the recess and to prevent them from breaking during assembly of the two portions.

According to a characteristic of the invention, the reinforcing fibers are made of ceramic, e.g. silicon carbide.

The sheets and the portions may be made of metal, e.g. of titanium-based alloy, and the fibers may be coated in a metal material, e.g. a titanium-based alloy.

Preferably, the coating of the fibers, the sheets, and the two portions are all made of the same metal material, and the two portions are assembled together by diffusion welding in such a manner that, after diffusion, the part comprises a homogeneous metal matrix having the reinforcing fibers inserted therein.

In a variant embodiment of the invention, the sheet is made by braiding fibers, which fibers may be of the same kind as the reinforcing fibers or of a different kind.

Prior to being inserted in the above-mentioned recess in one of the portions, the reinforcing means may be shaped to match the shape of the recess.

This makes it easier to put the reinforcing means into place in the recess prior to assembling the portions together.

In order to make it easier to insert the bundle the fibers in the sheet, the section of the bundle the fibers may be less than or equal to 95% of the section of the sheath.

The mechanical part is advantageously a piece of metal reinforcement for mounting on the leading or trailing edge of a composite blade of a turbine engine, such as a fan blade of an airplane turboprop or turbojet.

The invention may be applied to other mechanical parts of a turbine engine, such as in particular casings that require reinforced zones.

The invention also provides a reinforced mechanical part of a turbine engine obtained by performing the above-described method, the part being characterized in that it includes reinforcing means arranged in the core of the part, in at least one recess in junction surfaces of two portions of the part.

BRIEF DESCRIPTION OF THE SEVERAL VIEWS OF THE DRAWINGS

The invention can be better understood and other details, characteristics, and advantages invention appear on reading the following description made by way of nonlimiting example and with reference to the accompanying drawings, in which:

FIG. 1 is a perspective view of a portion of prior art reinforcement for a leading edge or a trailing edge of a turbine engine blade, made by assembling together two sheets;

FIGS. 2 to 4 are diagrammatic views of a portion of reinforcing means in three embodiments of the invention;

DETAILED DESCRIPTION OF THE INVENTION

Figure 5:
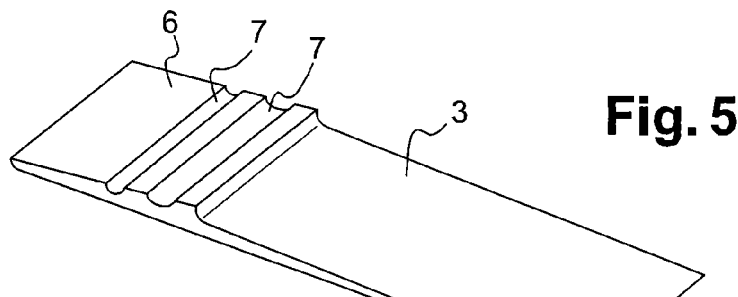
FIG. 5 is a perspective view of a portion of one of the sheets of the invention, prior to insertion of the reinforcing means.

FIG. 1 shows a portion of metal reinforcement 1 of the prior art made by assembling together two sheets 2, 3. The reinforcement is for mounting on the leading edge or the trailing edge of a composite blade for a turbine engine, such as a fan blade of an airplane turboprop or turbojet.

The reinforcement 1 is of streamlined shape and at the front it presents a solid portion 4 that is extended by two lips 5 for pressing against and adhesively bonding to the pressure side and the suction side surfaces of a fan blade made of composite material. Composite material fan blades are generally made by a method of the resin transfer molding (RTM) type.

Each sheet of the reinforcement 1 has a junction surface 6 for pressing against an identical junction surface of the other sheet when they are assembled together. When the two sheets 2, 3 are made of the same material, e.g. of titanium alloy, and when they are assembled together by diffusion bonding, the material of one of the sheets defuses into the other sheet, and vice versa, such that, after assembly, the junction plane between the two sheets may become invisible or practically invisible.

Although only a small portion of the reinforcement 1 is shown in FIG. 1, the reinforcement extends over the full length of the blade (which generally lies in the range 0.5 meters (m) to 1 m) and it follows the profile of the blade. It should be recalled that such a blade may be cambered and twisted, and that the reinforcement 1 needs to match the shape of the leading edge or the trailing edge of the corresponding blade.

The invention seeks to improve the mechanical characteristics of the reinforcement 1.

Figure 6:
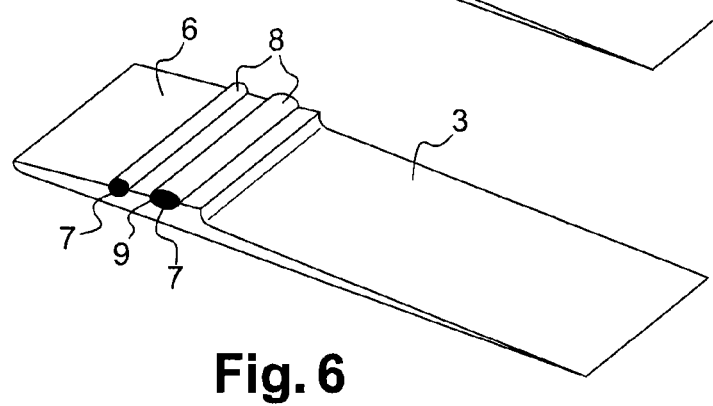
FIG. 6 is a view corresponding to FIG. 5, after inserting the reinforcing means.
Figures 7, 8:
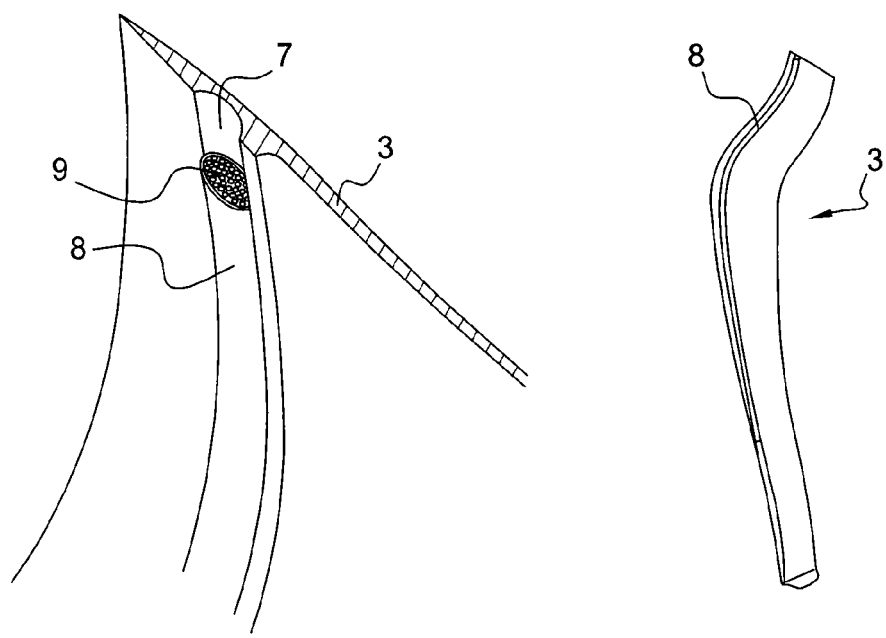
FIG. 7 is a perspective view of a portion of one of the sheets, having the reinforcing means inserted therein.
FIG. 8 is a diagrammatic view of a sheet having the reinforcing means inserted therein.

For this purpose, recesses 7 are made, e.g. by machining or by die stamping, in the junction surfaces 6 of the sheets 2, 3, over the major portion of the length of the sheets 2, 3 (see FIGS. 5 to 7). These recesses 7 are formed in zones that, after assembly, are to constitute the solid portion 4 of the reinforcement 1.

One or more recesses 7 may be made in each of the junction surfaces of the sheets 2, 3, with the recesses 7 being situated to face one another after said sheets 2, 3 have been assembled together.

The reinforcement 1 also includes one or more sheaths 8 having one or more bundles of fibers 9 inserted therein, the assembly being shaped to match the shape of the recesses 7 prior to being inserted in the recess(es) 7 of one of the sheets 2, 3.

In FIGS. 5 to 6, the portions shown of the sheets 2, 3 are substantially plane. Nevertheless, these sheets 2, 3 include cambered zones or portions, such as those shown in FIGS. 7 and 8.

By way of example, the section of the sheaths 8 may be circular (FIG. 2) or oval (FIG. 3), and the inside diameter of the sheaths 8 may be about 3 millimeters (mm) to 12 mm, for example.

The fibers 9, the sheath 8, and the recesses 7 extend along the reinforcement 1, over a length lying in the range 0.5 m to 1 m.

The fibers 9 are made of ceramic, e.g. of silicon carbide (SiC), and they are coated in a titanium-based alloy using a known coating method, e.g. as disclosed in document WO-A1-2010/136687.

The sheath 8 and the sheets 2, 3 are also made of a titanium-based alloy. By way of example, these elements are made of TA6V, T40, or TA3V2.5.

In a variant, the sheath 8 is made by braiding fibers 10 of the same kind as the reinforcing fibers 9, or of a different kind. The fibers 10 used for braiding the sheath 8 may for example be made of a titanium-based alloy or of silicon carbide.

The section of the bundle of fibers 9 is less than or equal to 95% of the section of the sheath 8 so that the bundle can be inserted easily into the inside of the sheath 8.

Once the or each sheath 8 has been placed in the corresponding recess 7 of one of the sheets 2, 3, e.g. the sheath 3, with the fibers 9 being held in position inside the sheaths 8, the two sheets 2, 3 can be assembled together via their junction surfaces 6. The sheaths 8 then become inserted in the recesses 7 of the other sheet 2. The integrity of the fibers 9 is preserved by the sheaths 8, which protect them and hold them in position during the assembly stage.

During this assembly, the two sheets 2, 3 are bonded together by diffusion bonding, with it also being possible for assembly to be performed by hot isostatic compression about a core. These methods are known in the prior art and they are not described in detail herein. In particular, document EP 1 574 270 in the name of the Applicant describes a method of making reinforcement, the method including a step of diffusion bonding. Patent applications FR 10/51992 and FR 11/50532, filed by the applicant and not yet published, describe methods of making reinforcement, which methods include a step of hot isostatic compression.

During diffusion bonding, the titanium present in the coating of the fibers 9, in the sheath(s) 8, and in the sheets 2, 3 diffuses from one element to another in such a manner that after diffusion the reinforcement 1 comprises a homogeneous metal matrix in which the fibers 9 are inserted. This confers mechanical properties on the reinforcement 1 that are increased by about 50% compared with the mechanical properties of prior art reinforcement.

The invention claimed is:

1. A method for producing a metal reinforcement for mounting on a leading edge or a trailing edge of a composite blade for a turbine engine, a fan blade of an airplane turboprop or turbojet, the metal reinforcement including a solid portion extended by first and second lips which are attached to pressure and suction side surfaces of the blade, the method comprising:

providing first and second sheets of the metal reinforcement, each of the sheets including a first portion corresponding to the solid portion of the metal reinforcement and a second portion corresponding to a lip of the metal reinforcement, the first portion including a junction surface;

providing at least one recess in each junction surface of the first and second sheets of the metal reinforcement;

inserting a bundle of reinforcing fibers surrounded by a sheath of elongate shape at least in part in the recess; and assembling together the first and second sheets such that the junction surfaces of the first and second sheets abut each other; and diffusion bonding the first and second sheets to form the metal reinforcement.

2. A method according to claim 1, wherein the reinforcing fibers are made of ceramic.

3. A method according to claim 1, wherein the first and second sheets are made of titanium-based alloy.

4. A method according to claim 1, wherein the reinforcing fibers are coated in a metal material.

5. A method according to claim 4, wherein the coating of the reinforcing fibers and the first and second sheets are all made of a same metal material, and the first and second sheets are assembled together by diffusion welding such that, after diffusion, the piece of metal reinforcement comprises a homogeneous metal matrix having the reinforcing fibers inserted therein.

6. A method according to claim 1, wherein the sheath is, made by braiding fibers.

7. A method according to claim 1, wherein, prior to being inserted in the recess of one of the portions, the bundle of reinforcing fibers is shaped to match a shape of the recess.

8. A method according to claim 1, wherein a cross-sectional area of the bundle of reinforcing fibers is less than or equal to 95% of a cross-sectional area of the sheath.

9. A piece of metal reinforcement for mounting on a leading edge or a trailing edge of a composite blade for a turbine engine, or a fan blade of an airplane turboprop or turbojet, and obtained by performing the method according to claim 1, comprising reinforcing means arranged in a core of the piece of metal reinforcement in recesses in junction surfaces of two portions of the piece of metal reinforcement.

10. A method according to claim 2, wherein the reinforcing fibers are made of silicon carbide.

* * * * *